United States Patent [19]

Ahmed

[11] 4,379,950
[45] Apr. 12, 1983

[54] DISTRIBUTED CONTROL MEMORY NETWORK

[75] Inventor: Fahim Ahmed, Guelph, Canada

[73] Assignee: International Telephone and Telegraph Corporation, New York, N.Y.

[21] Appl. No.: 135,464

[22] Filed: Mar. 31, 1980

[30] Foreign Application Priority Data

Jul. 23, 1979 [CA] Canada .................................. 332385

[51] Int. Cl.³ ............................................. H04M 3/00
[52] U.S. Cl. .................................... 179/18 ES; 370/58
[58] Field of Search ........................ 364/200 MS File; 179/18 ES, 18 EB; 370/58

[56] References Cited

U.S. PATENT DOCUMENTS 4,096,572 6/1978 Namimoto ............................ 364/200
4,144,407 3/1979 Zaffignani et al. .............. 179/18 ES

*Primary Examiner*—Joseph A. Orsino, Jr.
*Attorney, Agent, or Firm*—James B. Raden; Marvin M. Chaban

[57] ABSTRACT

A computer-controlled distributed communication system in which there is a system controller and a plurality of group controllers all interchanging information over a system bus. Each group controller has its individual group bus for the exchange of information between stations of the group and the group controller. Each group controller shares a portion of its random access memory (RAM) with the system controller. When information is directed at approximately the same time to the RAM from a group central processing unit (CPU) bus and from the system CPU bus, the first to access the RAM is enabled to feed its information. Neither bus has any preference. The fed information is stored temporarily in a temporary storage of mailbox RAM in the group. Within the mailbox RAM, separate sections are provided for the storage of information for each direction of information transfer. The mailbox RAM is periodically interrogated during regular scans by the respective controllers to determine if information is stored awaiting transfer. An indication of stored information in a section triggers the transmission of information from the mailbox RAM when the destination bus is available. In this way, each processor can continue functioning without the imposition of a hold condition when access to the bus is not possible at that time.

3 Claims, 6 Drawing Figures

DISTRIBUTED CONTROL MEMORY NETWORK

BACKGROUND OF THE INVENTION

With the development of microprocessors, the major trend in computer-controlled communications systems has been directed to distributed systems including a central controller including one or more processors and individual module or group controllers each including a microprocessor. For example, see U.S. Pat. No. 4,127,742 issued Nov. 28, 1978 to G. Couturier et al.

In such systems, there may arise situations where more than one controller is attempting to access a particular bus. In most systems, a bus assigner is used to control access to a bus based on preassigned priorities and processors denied access are placed in a hold condition. For example, see U.S. Pat. No. 3,959,775 issued to J. Valassis et al on May 25, 1976.

Alternatively, as noted in the last-named patent, a bus assigner is used to sequentially scan the microprocessors and assign a place in a queue to the processors dependent on the order in which the request is received.

In other systems, the systems controller is given priority access in the even of simultaneous requests and the group processors are placed in a hold condition.

SUMMARY OF THE INVENTION

The invention is directed to a telecommunication system with distributed processing of message information. In such systems, information or data must be interchanged bidirectionally between group or module processors and the central controller or processor over respective busses, group busses and a system bus.

With separate busses in the system, a plurality of tasks may be performed simultaneously with the information transfer involved in a task being made over different busses. The system can be configured so that one processor may be writing information in the memory associated with a bus and another processor may be reading from that bus at the very same time.

Access problems only arise when more than one processor is attempting to access one memory to perform the same operation, i.e., either read or write. In such cases, the first to request access is given access to a temporary memory which I call the mailbox memory. In that memory, separate sections are provided for storage in each direction of transmission. Processors denied access to the bus requested are temporarily placed on a hold of short duration. The temporary memory is periodically interrogated from both directions to determine whether there is information stored in the mailbox memory for the interrogating processor. Any such information may then be read out.

On simultaneous requests from more than one processor, a circuit is provided to arbitrarily designate one of the requesting processors as the one to which access is allowed and to place other processors on a temporary wait or hold.

It is therefore an object of the invention to provide an improved communications arrangement between busses of a distributed processing system.

It is a further object of the invention to provide a telecommunications switching system using distributed group or modular architecture and time division principles in which data is transmitted on a plurality of busses between processors accessing those busses, and in which all data between busses is stored in a temporary memory within a group or module and is read in response to a scan of that temporary memory.

It is a further object of the invention to provide a telecommunications system of the distributed processor type in which each distributed processor has a bus for transfer of data and in which there is a system processor with a system bus for its data transfer, and in which data transfer between busses is through a temporary memory on a first-come, first-serve basis.

It is a further object to provide a distributed processing telecommunications system in which the system controller may assume control of any group controller memory, altering the data therein at high speed.

DETAILED DESCRIPTION OF THE DRAWINGS

Figure 1:
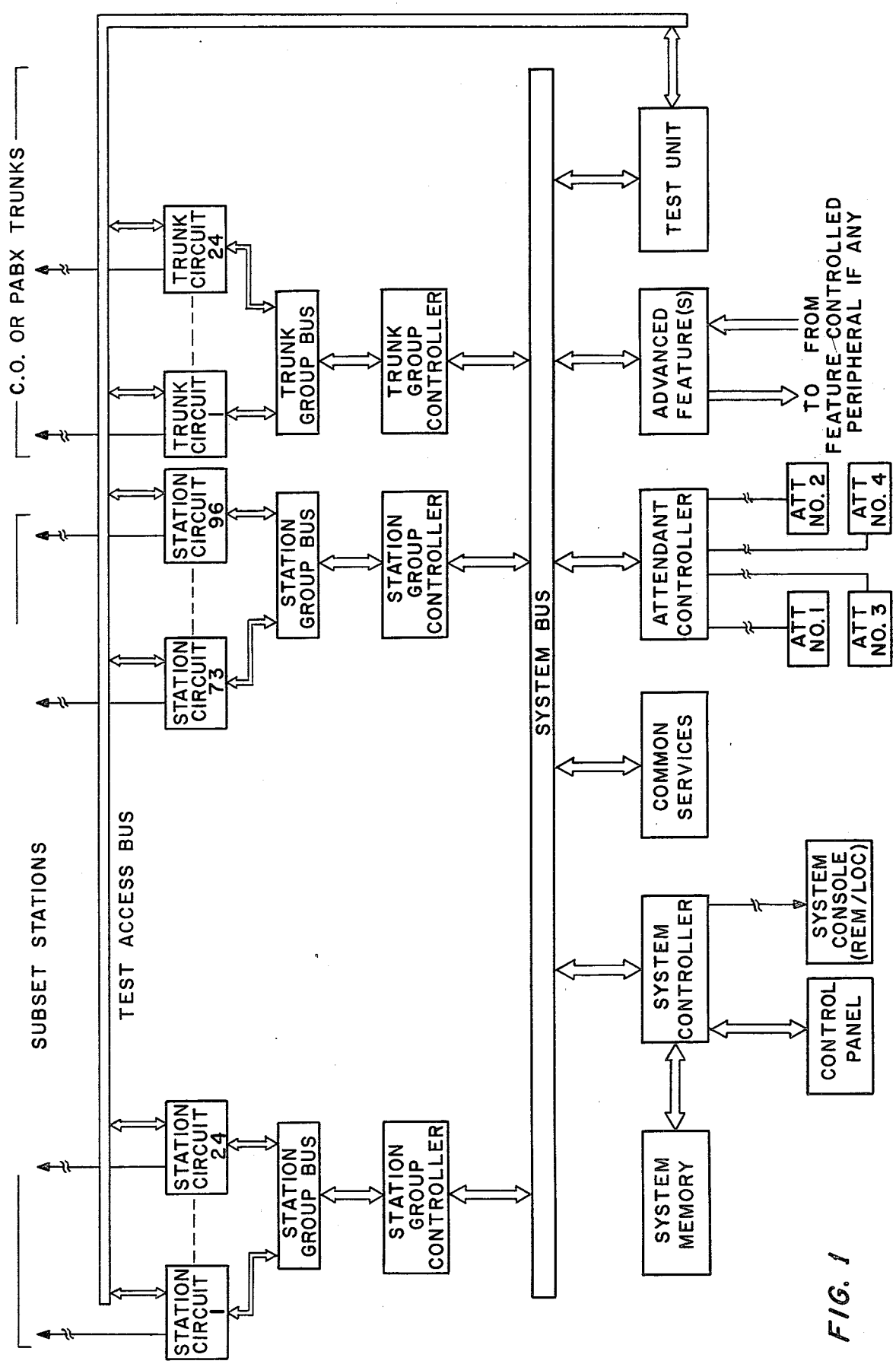
FIG. 1 is a block diagram of the control network of a system employing my invention.

In FIG. 1, I show the control network of a distributed telecommunications system which may be considered an exchange such as a PABX or central office. The system is designed for the use of time division switching and control of transfer of message data between stations of the system or from a station of the system through a trunk to a station at another exchange. The stations are connected to the station circuits, ninety-six of such circuits being shown directly or indirectly as numbered 1-96. Trunk circuits occupy the same level as stations in the system, and 24 trunk circuits are shown.

The stations and trunks are grouped in groups of twenty-four, with the stations or trunks of each group being multipled to a group bus. Each group bus has its own group controller through which stations of the group have access to the system bus. Coupled to the system bus are the system controller with its satellite system memory, a common services block for providing features such as tone circuits, registers, and conference circuits, an attendant controller and optional circuits such as advanced features circuits and a test unit. As shown in FIG. 1, the system controller may have a display control panel and system console allied with it.

As is conventional, analog speech and control signals from a station or trunk are digitized within a station circuit and digital control data and message data are sent to the group controller. As necessary, data messages from the group controller are forwarded to the system controller over the systems bus.

Figure 2:
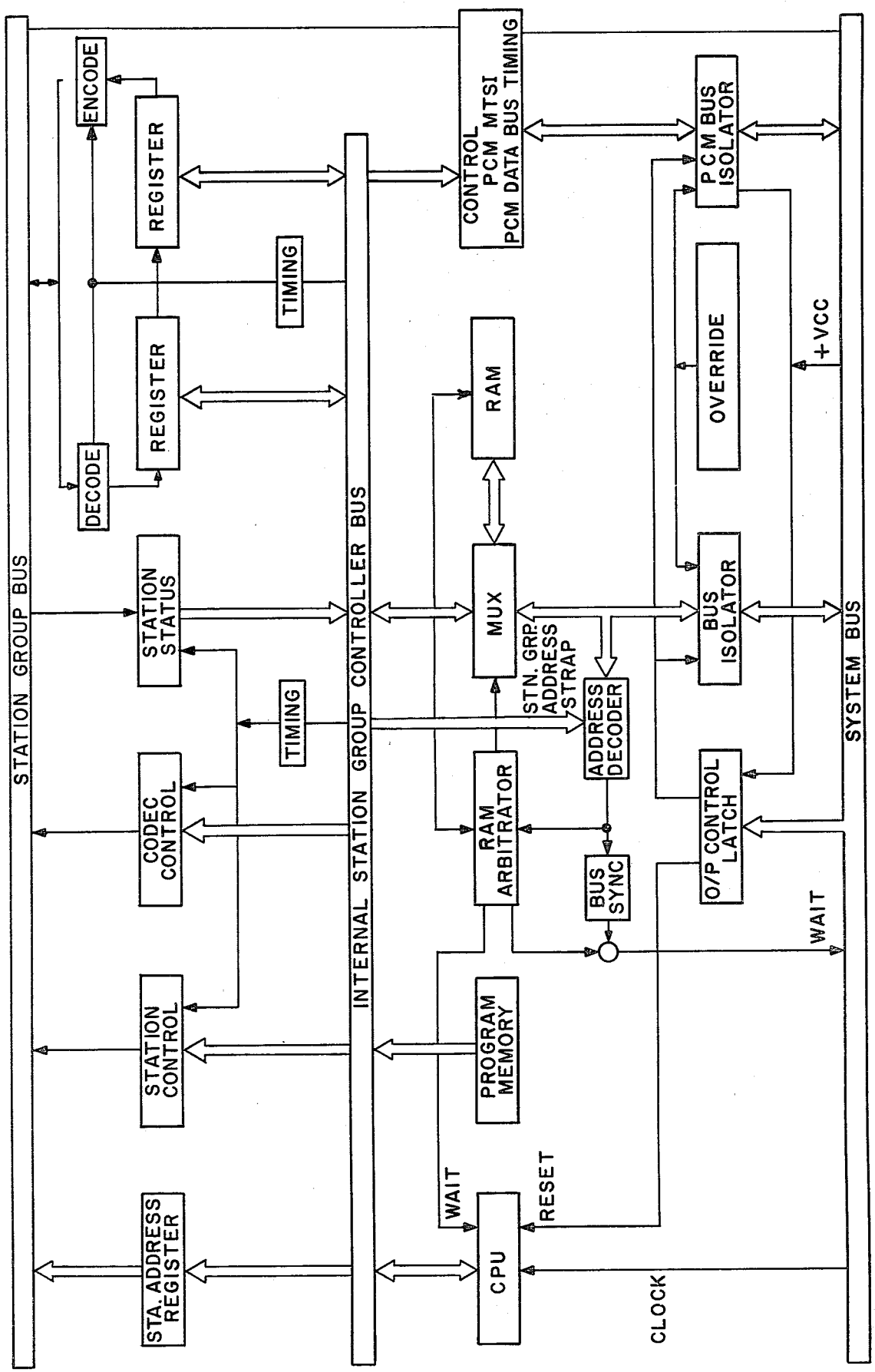
FIG. 2 is a block diagram of a station group controller of FIG. 1.

In FIG. 2, I show in block form the elements of a typical group controller of FIG. 1, the controller of FIG. 2 being a station controller, rather than a trunk controller. The controller as shown is positioned between the system bus serving all groups and its own internal group bus for transferring data to the stations and/or trunks. The internal group controller bus has access to the stations of the group over circuits such as station address register, station control circuit, codec control, station status and timing which accesses the station group bus. Where the group is a station group rather than a trunk group and is to have key system capability, registers are provided for stations and lines and their control.

Each group controller includes a processor or CPU which may be of any known type such as an Intel 8085 microprocessor. The processor has a program memory accessible over the internal controller bus, a suitable memory being the Intel 2716, a 2K by 8 bit memory. A PCM time slot interchanger is provided in each group controller to temporarily store addresses and message data for control of transmission of data during time slots or channels which are communicating with one another. Such time slot interchangers are, of course, well-known in the art.

In addition, the group controller includes a multiplexer communicating with the group internal bus and with the system bus through a bus isolator. The multiplexer feeds address and message data to a mailbox RAM, to a RAM arbitrator, a bus isolator and various ancillary circuits such as an address decoder, bus synch circuit and output control latches.

Figure 3A:
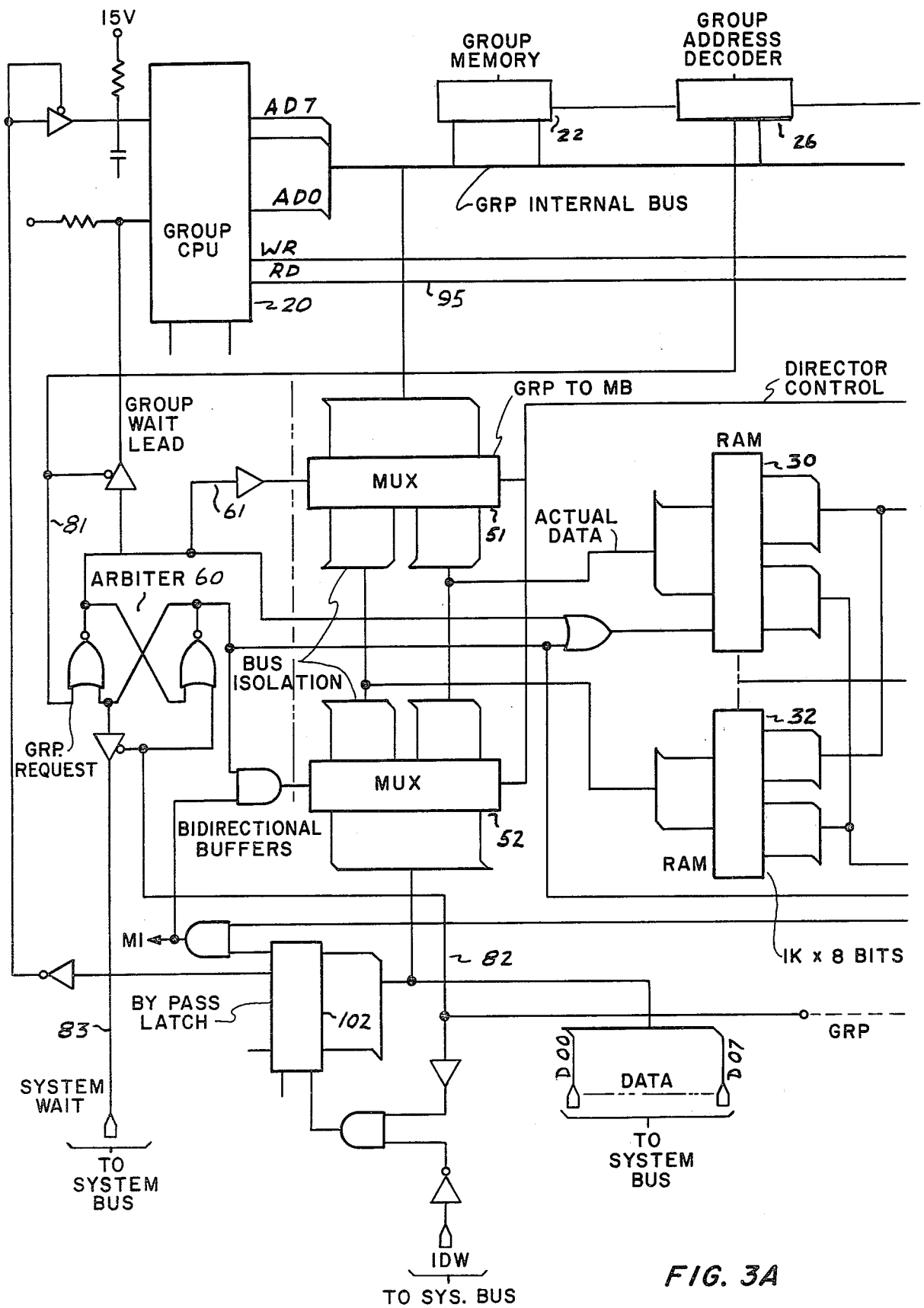
FIGS. 3, 3A and 3B are a circuit diagram in detail of the mailbox RAM portion of the block diagram of FIG. 2.
Figure 3B:
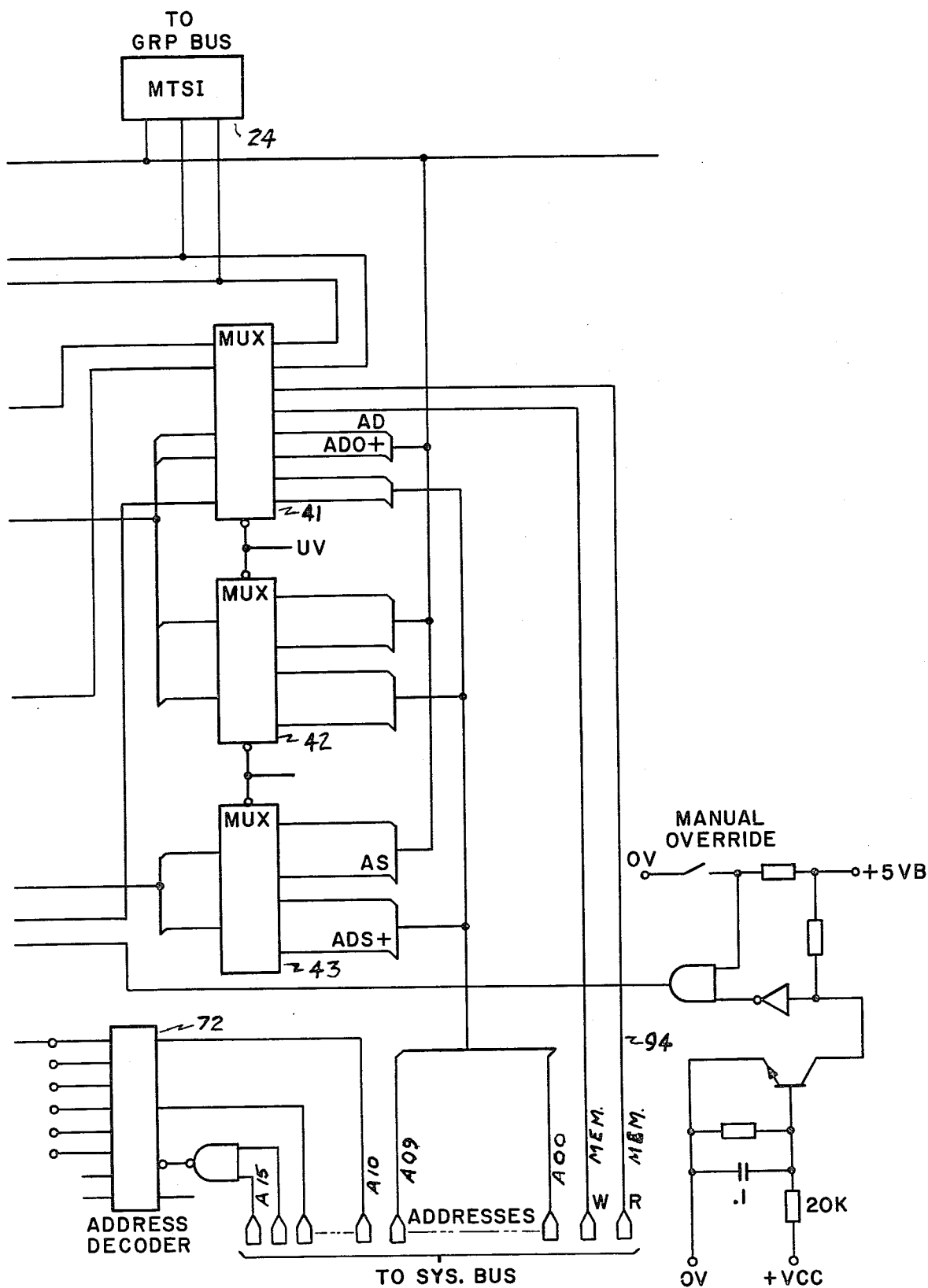
Figure 3:
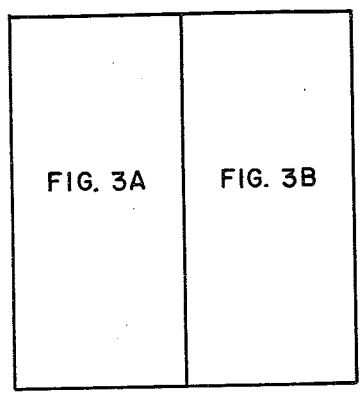

In FIG. 3 of the drawings, I show relevant portions of the group controller in greater detail. Shown in this figure in block form are the processor 20 for the group controller, the group memory 22, the time slot interchanger 24 for the group controller and an address decoder 26 for the time slot interchanger. The mailbox network or temporary RAM network provides access between the Group bus which is connected to the time slot interchanger, the group controller processor and the group memory and the System bus represented by the address terminals and data terminals of FIG. 3. These address and data terminals are connected to the system processor and its memory.

Figure 4:
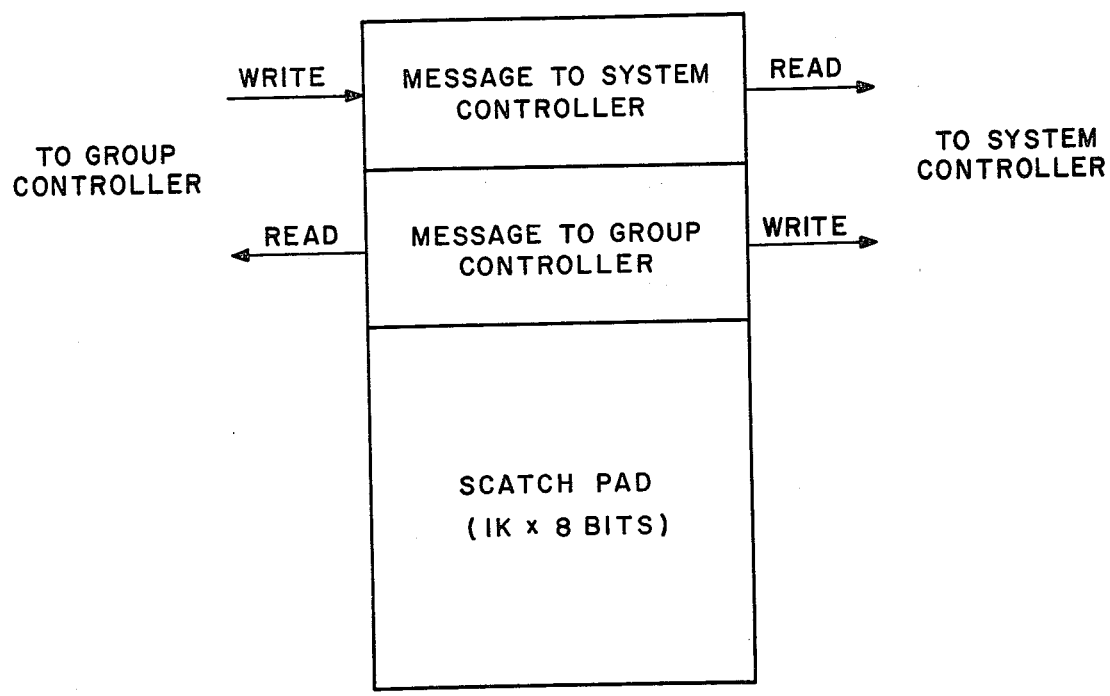
FIG. 4 is a block diagram of the general arrangement of the memory of mailbox RAM of FIG. 3.

This mailbox includes as its main element, the RAM shown as two blocks 30 and 32. These blocks may constitute a memory for 1K words of 8 bit length comprised of two Intel 2114 memories connected together as shown. The RAM is generally organized as shown in FIG. 4 as including addresses for each direction of transmission, i.e., system to group and group to system and the scratch pad area for data indicated by the addresses of the address area.

Further in FIG. 3, I show a multiplexer 41-43 comprised of three blocks for feeding addresses from the system bus address terminals to the memory over leads A00 to A09. An additional pair of leads MEM-W and MEM-R from the system bus provide controls for reading and writing memory information.

Further read and write control leads (RD and WR) extend from the group processor to the multiplexer for memory control. A second set of multiplexers 52, 51 acting as bidirectional, bus isolator buffers are provided one for the system to group direction and the other for group to system. The multiplexers or buffers 52, 51 are controlled by the arbitrator latch flip-flop 60, the respective flip-flop outputs 61 and 62 each enable one or the other of the buffers. The latch 60 is triggered to one of its conditions based on the particular address decoder from which information is received. A first address decoder 72 receives addresses from the system controller on leads A10–A15 and through a strapped output terminal accesses the right input 82 to the latch flip-flop while the group address decoder 26 feeds the left input 81 to the flip-flop.

The latch is set to one output condition by the system controller and to its other condition by the group controller. One output lead 62 from the group side of the arbitrator provides a wait signal to the system controller on lead 83 indicating that the group controller is feeding information and information from the system is put on wait for a timed period. This output lead 62 also acts to disable MUX 51. The other output lead 61 is enabled to produce a hold signal to the group controller 20 and multiplexer 52 to inhibit signals from this controller for a timed period. Other functions may be performed during this period, the wait being for use of the memory for storage only.

The mailbox is always scanned by MEM-R lead 94 from the system bus through the MUX 41 for the system to group direction and through the Rd lead 95 from the group processor to see if a flag or bit in memory indicates that information is stored in memory for read out in that direction. On indication of a message to be read, the controller initiates a read indication for destructive read out of the stored message.

The organization of the temporary memory 30, 32 of FIG. 3 is shown in FIG. 4 as having four sections. The sections include a first section which is directed to messages from the group controller to the system controller. Messages are written under the control of the group control for read out and transmission to the system controller. A bit is provided for each word to be sent and each word has associated with it a flag bit which may be read by the system controller to indicate that a message is waiting to be sent to the system bus.

The next section of temporary memory 30, 32 is set aside for messages to the group controller from the system. The size of the sections is dependent on traffic considerations, however, a memory area of about fifty words is considered sufficient, the sections being of approximately equal size.

The remainder of the memory may be used for scratch pad memory as desired.

The RAM of FIG. 4 is eight bits wide. Information between the system and group processors uses seven bits while the eighth and most significant is a flag bit for the indication of stored data awaiting transfer. Within the memory of FIG. 4, the scratch pad area is used by the group controller to store temporary data. All call control data between the group and system controller are temporarily stored in the mailbox memory.

Both group and system controllers scan the information stored in the mailbox RAM. The group controller scans over the Internal Group bus over its leads AD0 to AD7 and multiplexer 51. For the system controller, the RAM is scanned over leads D00 to D07 and multiplexer 52. Both data busses are time division multiplexed and are used for Data Read and Data Write by their respective processor.

When a processor desires to read from or write into the mailbox RAM, it will place an address in its respective address bus. (A10 to A15 and AD0 to A15). The two address decoders 26 and 72 will decode these addresses and issue a request for access to the RAM. The system controller request is indicated over lead 82 while the group controller request is indicated over 81. The arbitrator will acknowledge one of the processors by not providing a wait indication. The processor denied access is provided with a wait indication.

In the event of a fault in one of the group controllers such that the communication path through the mailbox RAM is interrupted, the latch 102 provides a parallel path into the group controller and is used for resetting or isolating that group controller. The latch is a parallel 8 bit latch and therefore provides up to eight individual controls that the system controller can set/reset to control various circuits within the group controller and its shelf.

The manual override switch 104 (FIG. 3B) is a mechanical toggle switch located on the front edge of the group controller card. It has the same function as the isolate bit of latch 102. With these two controls, the group controller may be automatically isolated by the system controller (latch 102) or manually isolated by an operator (switch 104).

I claim:

1. A distributed communications system including a common system controller including system processor and associated memory, said system controller operative to control a plurality of groups of stations, with each group of stations including a group controller comprised of a group processor and associated memory, a system bus interacting between said system controller and said group controllers for the transfer of data in pulse code modulation from said system controller to selected ones of said group controllers and from said group controllers individually to said system controller, a common random access memory in each group controller for providing temporary storage for channeling control data bidirectionally between the system processor and the group processor of the respective group, first address control means in a group controller for accessing said last-mentioned memory in the group of that controller from said system bus for transfer of data from said bus to said memory, second address control means in said group controller for accessing said last-mentioned memory for the transfer of data to said last-mentioned memory from said group and means responsive to first receipt of a signal indicative of means accessing said last-mentioned memory for applying a wait signal to any other accessing means attempting to access said memory and in which each group controller includes a direct path to its group processor by passing said temporary storage memory whereby to reset the group processor on a signal from the system processor over said direct path.

2. A system as claimed in claim 1, in which said wait signal applying means comprises a bistable latching member and in which there are bus isolator buffers interposed between the output of said wait signal applying means and said temporary memory.

3. A system as claimed in claim 1, in which said direct path in each group controller from said system bus to the processor of that group comprises a bistable latch member to reset and isolate the group processor on the occurrence of a problem condition.

* * * * *